June 13, 1961 H. WARNECKE 2,988,058
LOCKING MEANS FOR FLUID PRESSURE ACTUATED DEVICE
Filed Jan. 5, 1960

INVENTOR.
Hans Warnecke
BY Henry E. Otto
Attorney

United States Patent Office 2,988,058
Patented June 13, 1961

2,988,058
LOCKING MEANS FOR FLUID PRESSURE ACTUATED DEVICE
Hans Warnecke, Gronau, Hannover, Germany, assignor to Westinghouse-Bremsen-Gesellschaft m.b.H., Hannover, Germany
Filed Jan. 5, 1960, Ser. No. 655
Claims priority, application Germany Jan. 10, 1959
7 Claims. (Cl. 121—40)

This invention relates to locking means for fluid pressure actuated devices and more particularly relates to a locking means operable by fluid under pressure to lock an associated fluid pressure actuated device in a preassumed position so that the latter will not be displaced therefrom even if the resilient force exerted thereon by the fluid pressure medium is exceeded by an opposing force.

It has heretofore been proposed to employ a fluid pressure actuated clamping device to clamp a work piece in a desired position in a machine tool, such as a shaper. The clamping fluid pressure employed in these devices must obviously be limited to prevent excessive distortion of the work piece; and hence it is possible for the work piece to move relative to the clamping device if, due such as to hard spots in the work piece, high cutting forces are encountered which overcome the resilient clamping force exerted by the clamping fluid pressure.

The principal object of this invention is therefore to provide a relatively simple and economical locking arrangement for maintaining a fluid pressure actuated device or member locked in a preassumed position even if it should tend to be displaced therefrom by a counterforce of greater magnitude than the resilient force exerted by the pressure fluid acting on said device or member.

Figure 1:
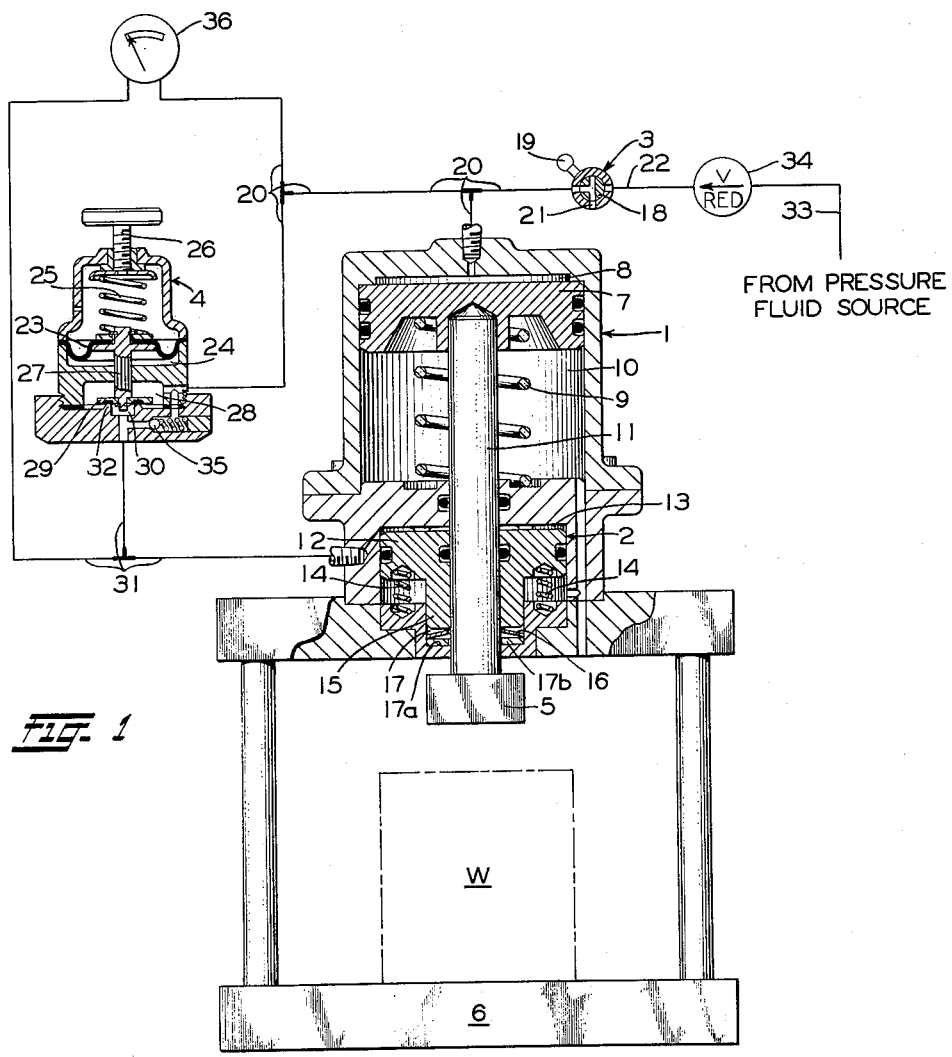
Figure 2:
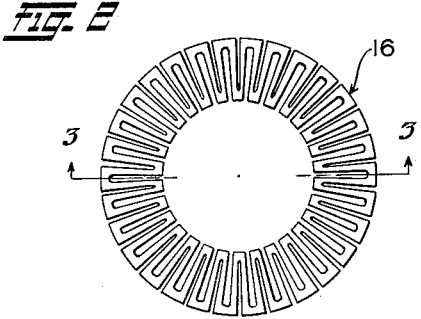
Figure 3:

Other objects and advantages will become apparent from the following more detailed description of the invention and from the accompanying drawing, wherein: FIG. 1 is a diagrammatic view, partly in section and partly in outline, of a fluid pressure actuated clamping or chucking device suitable for a machine tool and provided with a locking means embodying the invention; FIG. 2 is a plan view, to enlarged scale, of a locking element shown in FIG. 1; and FIG. 3 is a section view taken along the line 3—3 of FIG. 2.

Description

As shown in FIG. 1, the apparatus embodying the invention comprises a fluid pressure actuated device 1, a locking device 2 operable by fluid under pressure for mechanically locking the device 1 in a preassumed position, an operator's control valve device 3 for effecting actuation of device 1 to said position, and a device 4 for delaying operation of device 2 until after device 1 has assumed said position.

Device 1 controls positioning of an element which, for sake of illustration, has been shown to be a clamping head 5 that serves to clamp a work piece W between said clamping head and a work-piece support structure 6 of a machine tool (other structural details of which are not shown). Device 1 comprises a piston 7 reciprocable in a sectionalized casing and subject opposingly to pressure of fluid in a chamber 8 and to pressure of a helical bias spring 9 in an atmospheric chamber 10. To the chamber 10 side of piston 7 is coaxially connected one end of a piston rod 11 to the opposite end of which head 5 is detachably connected.

Device 2 comprises an annular piston 12 which sealingly surrounds, and is reciprocable relative to, piston rod 11. Piston 12 is subject opposingly to pressure of fluid in a pressure chamber 13 and to a resilient bias pressure provided such as by a plurality of helical springs 14 arranged in a circle around the piston rod 11 in an atmospheric chamber. Coaxially connected to the spring-biased side of piston 12 is a tubular piston rod 15 that encircles piston rod 11. Rod 15 is adapted to contact and apply a generally axial force to a resilient locking element 16 that encircles piston rod 11 and is disposed in a chamber 17, in part defined by an inwardly directed shoulder 17a. This locking element 16 may, for sake of illustration, be of the type shown in FIGS. 2 and 3 and comprising a concavo-convex washer made of spring steel and provided with a plurality of uniformly circumferentially-spaced radial slits.

Valve device 3 may, for sake of illustration, comprise a plug valve 18 operable by a handle 19 for selectively connecting a control pipe 20 to a vent port 21 or to a supply pipe 22.

Device 4 may comprise a diaphragm piston 23 reciprocable in a sectionalized casing and subject opposingly to pressure of fluid in a chamber 24 and to the pressure of a helical spring 25, the bias of which is adjustable by means of a screw 26. Piston 23 has a piston rod 27 that has slidably guided contact with the wall of an aligned bore through a casing partition separating chamber 24 from a chamber 28 open to control pipe 20; and fluid conveying means, such as flutes on said piston rod, is provided to permit flow of pressure fluid between chambers 24 and 28. A preferably disc-shaped valve 29 in chamber 28 controls connection of said chamber with a chamber 30 that is connected via pipe 31 to chamber 13 of device 2. Valve 29 is connected to piston rod 27 so that it will normally be held operatively seated by spring 25 against an annular seat rib 32 to prevent supply of pressure fluid to chamber 13 until pressure in chamber 24 exceeds a high value corresponding to the preadjusted bias of spring 25; whereupon fluid at the pressure provided in control pipe 20 will be supplied to chamber 13.

Interposed between pipe 22 and a pipe 33 connected to a fluid pressure source (not shown) is a reducing valve 34 preferably of the manually adjustable type to vary the maximum clamping pressure to be provided in chamber 8 of device 1 according to the character of the work piece W.

In operation, assume that work piece W has been placed against the support structure 6 and that all components are in the respective positions in which they are shown in the drawing. To clamp the work piece W firmly against the support structure 6, handle 19 of device 3 is rocked clockwise to cause valve 18 to supply fluid, at the pressure corresponding to the reducing valve setting, from pipe 22 to control pipe 20 and thence to chambers 8 and 28 of devices 1 and 4, respectively. As soon as pressure in chamber 8 exceeds a relatively low value, piston 7 and piston rod 11 will be shifted promptly relative to the now stationary piston 12 of device 2 and move clamping head 5 into clamping contact with work piece W. Thereafter, when pressure in chamber 28 and hence in chamber 24 of device 4 exceeds the high value corresponding to the bias of spring 25 and preferably almost equal to the reducing valve pressure setting, piston 23 will be shifted and operatively unseat valve 29 for supplying pressure fluid from pipe 20 to chamber 13 of device 2. The fluid at high pressure thus rapidly supplied to chamber 13 will shift annular piston 12 downward with a snap-like action against resistance of springs 14 and relative to the now stationary piston rod 11 for applying a generally axial force to the convex face or crown of the locking element 16, which element is backed up by direct contact with shoulder 17a or by indirect contact therewith (as shown) through the medium of a flat spacer washer 17b. This axial force tends to flatten element 16 and in so doing displace same radially into mechanical gripping or locking contact with the piston rod 11 and side wall of chamber 17 and thus lock the clamping head 5 in its previously assumed clamping position.

Thus, even if the preselected maximum clamping pressure provided in chamber 8 of device 1 should be insufficient per se to maintain the work piece W adequately clamped in event of an abnormally high cutting force or torque, the mechanical locking action of the resilient locking element 16 will augment the action of the clamping pressure and prevent shifting of the work piece.

To unclamp the work piece W, valve 18 is moved to its vent position in which, as shown, it vents control pipe 20 and hence chamber 8 of device 1. Meanwhile, pressure fluid will also flow from chamber 13 of device 2 to the now vented pipe 20 in bypass of valve 29 and via a check valve 35 interposed between chambers 30, 28, for thereby substantially venting chamber 13; whereupon springs 14 will shift piston 12 and piston rod 15 upward relative to piston rod 11 and unlock the latter by removing the axial force from the locking element 16. This, in turn, will enable spring 9 to move the piston 7 and piston rod 11 upward and thereby withdraw the clamping head 5 from contact with the work piece W, so that the latter may be removed.

It is to be noted that the resilient locking element 16 will return to its normal state, as shown in FIGS. 2 and 3, when the axial force is removed, and that it will not be permanently deformed; and that a plurality of these metallic locking elements may be slipped onto piston rod 11 in serial or tandem relation to provide increased holding power. Also, if desired, a locking element formed of rubber may be used in lieu of the spring-steel type illustrated herein.

If desired, a gage 36 may be connected to branches of pipe 20 and pipe 31 to read the pressure differential between said pipes and hence chambers 8 and 13 to facilitate adjustment of the bias of spring 25 of device 4 and the setting of reducing valve 34. Also, instead of device 4, it will be understood that a valve device may be used which selectively connects pipe 31 to a separate vent or to pipe 20 according to whether pressure in pipe 20 is less than or exceeds a certain value, in which case check valve 35 would be eliminated and pipe 31 would be vented in bypass of, rather than via, pipe 20. Or if preferred, device 4 may be replaced by a check valve and choke arranged in parallel between pipes 20, 31 to delay the rate of buildup of pressure in chamber 13 and vent said chamber at a substantially unrestricted rate.

It will also be understood that the novel locking arrangement herein dsiclosed may be associated with any device which is resiliently biased (by fluid under pressure or a spring) to a preassumed position, and its use is not necessarily limited to fluid pressure actuated clamping or chucking devices.

Having now described the invention, what I claim as new and desire to secure by Letters Patent, is:

1. Apparatus for locking a member in a position to which it is operable by a resilient force, said apparatus comprising a resilient locking element disposed in a chamber surrounding the member, motor means surrounding the member and movable axially relative thereto, and resilient means biasing the motor means to one position in which it exerts no deforming force on said element and permits the member to move relative to said motor means and element to said position, said motor means being operable by fluid under pressure to another position in which it applies a force to said element for deforming the latter into frictional gripping contact with the member and side wall of the chamber to lock the member against movement, whereby upon supply of pressure fluid to said motor means the member will be positively locked in such position even if the member should be operatively subjected to a force opposing and of greater magnitude than the resilient force.

2. Apparatus for locking a member in a certain position to which it is operable by a fluid pressure motor responsively to an operating fluid pressure exceeding a chosen value, said apparatus comprising a first conduit through which the operating fluid may be supplied to the fluid pressure motor, a resilient locking element surrounding the member and disposed in a chamber, motor means surrounding the member and movable axially relative thereto, a branch conduit connecting said motor means to said first conduit, means resiliently biasing the motor means to one position in which it exerts no deforming force on said element and permits the member to move relative to said motor means and element, said motor means being operable by fluid under pressure supplied thereto through said branch conduit to another position for deforming said element into frictional gripping contact with the member and side wall of the chamber to lock the member against movement, and delay means interposed in said branch conduit for delaying the supply of operating fluid pressure to said motor means until after the operating fluid pressure supplied to the fluid pressure motor exceeds a certain value higher than said chosen value, thereby to cause locking of the member after it has attained its said certain position.

3. Apparatus for locking a member in a certain position to which it is operable by a fluid pressure motor responsively to charging of one chamber with fluid at a pressure exceeding a chosen value, said apparatus comprising a first conduit through which fluid under pressure may be supplied to the one chamber of the fluid pressure motor, resilient locking means surrounding the member and disposed in a chamber, motor means surrounding the member and movable axially relative thereto, a branch conduit connecting said motor means to said first conduit, means resiliently biasing the motor means to one position in which it exerts no deforming force on said locking means and permits the member to move relative to said motor means, said motor means being operable by fluid under pressure supplied thereto through said branch conduit to another position for deforming said locking means into frictional gripping contact with the member and side wall of the chamber to lock the member against movement, and valve means interposed in said branch conduit and controlled by pressure in the one chamber, via said first conduit and said branch conduit, and an opposing bias pressure and operative to supply pressure fluid to said motor means only after pressure in the one chamber exceeds a certain value higher than said chosen value.

4. Apparatus according to claim 3, wherein said valve means operates to disconnect and connect the one chamber with said motor means according to whether pressure in the one chamber is respectively less than or exceeds said certain value, and including a check valve for permitting pressure fluid to flow from said motor means to the one chamber in bypass of said valve means and prevent such bypassing flow in the reverse direction.

5. In a machine tool of the type comprising a clamping means for clamping a work piece against a support, a member operably connected to the clamping means, and a fluid pressure motor connected to the member and responsive to supply of pressure fluid to one chamber to move the clamping means to a clamping position, the combination of a first conduit through which the pressure fluid may be supplied to the one chamber of the fluid pressure motor, a casing, a resilient locking element surrounding the member and normally loosely disposed in a member-encircling chamber in the casing so as to permit movement of the member relative to said element, annular means including a piston and piston rod surrounding the member, said piston being sealingly reciprocable relative to the member and subject opposingly to pressure of fluid in another chamber and to a resilient bias pressure, a branch conduit connecting said other chamber to said first conduit, said piston rod being operatively responsive to pressurization of said other chamber to apply a deforming force to said element to cause it to frictionally grip the outer peripheral surface of the member and the wall of the member-encircling chamber to lock the member and thereby the clamping means in place, and delay means interposed in said branch conduit for delaying the supply of operating fluid under pressure to said other chamber until pressure in the one chamber has exceeded a value sufficient to have caused the fluid pressure motor to have moved the clamping means to clamping position.

6. Apparatus for locking a member in a certain position to which it is operable by a resilient force, said apparatus comprising a resilient concavo-convex annular locking element coaxially encircling the member in a chamber into which the member extends, said locking element having a plurality of symmetrically and circumferentially spaced radial slits alternately breaking the inner and outer circumferences of said locking element, annular motor means surrounding the member and movable axially relative thereto, and resilient means biasing said motor means to one position in which it exerts no deforming force on said locking element and permits the member to move relative to said motor means and said locking element to its said certain position, said motor means being operable by fluid under pressure to another position in which it applies a force normal to said locking element tending to flatten the latter into frictional gripping contact with the member and side wall of said chamber to lock the member against movement, whereby upon supply of pressure fluid to said motor means the member will be positively locked in its said certain position even if the member should be operatively subjected to a force opposing and of greater value than the resilient force.

7. The combination as defined in claim 5 wherein the delay means comprises a casing having therein a pressure chamber open to said first conduit, valve means disposed in said pressure chamber for controlling communication through said branch conduit between said pressure chamber and said other chamber, and biasing means for biasing said valve means toward one position in which said communication between said pressure chamber and said other chamber is disestablished, said valve means being operably responsive, after buildup of fluid pressure in said pressure chamber to a value exceeding that in said one chamber, to move to a different position in which said communication is established.

References Cited in the file of this patent

UNITED STATES PATENTS 2,673,624    Huber _____ Mar. 30, 1954